(12) United States Patent
Na et al.

(10) Patent No.: US 9,105,886 B2
(45) Date of Patent: Aug. 11, 2015

(54) LARGE-AREA DEMINERALIZER FOR FUEL CELL

(75) Inventors: Sung Wook Na, Gyeonggi-do (KR); Hun Woo Park, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 618 days.

(21) Appl. No.: 13/272,689

(22) Filed: Oct. 13, 2011

(65) Prior Publication Data

US 2012/0315563 A1 Dec. 13, 2012

(30) Foreign Application Priority Data

Jun. 13, 2011 (KR) .................. 10-2011-0057079

(51) Int. Cl.
*H01M 8/04* (2006.01)
*H01M 8/00* (2006.01)

(52) U.S. Cl.
CPC ............ *H01M 8/04044* (2013.01); *H01M 8/04* (2013.01); *H01M 8/04776* (2013.01); *H01M 8/00* (2013.01); *H01M 8/04358* (2013.01); *H01M 8/04783* (2013.01); *Y02E 60/50* (2013.01)

(58) Field of Classification Search
CPC .................................................. H01M 8/04044
USPC .................................. 429/450, 429, 437, 512
See application file for complete search history.

(56) References Cited

U.S. PATENT DOCUMENTS

2004/0001985 A1* 1/2004 Alva ............................. 429/26
2005/0115884 A1* 6/2005 Suzuki et al. ................. 210/282

FOREIGN PATENT DOCUMENTS

| JP | 2002298885 A | 10/2002 |
| JP | 2007-296419 A | 11/2007 |
| JP | 2009123518 A | 6/2009 |
| KR | 10-2002-0032684 A | 5/2002 |
| KR | 10-2008-0053939 | 6/2008 |
| KR | 10-2011-0061731 A | 6/2011 |

OTHER PUBLICATIONS

JP 2007_296419-MT.*
KR 1020000063120-MT.*

* cited by examiner

*Primary Examiner* — Patrick Ryan
*Assistant Examiner* — Alex Usyatinsky
(74) *Attorney, Agent, or Firm* — Mintz Levin Cohn Ferris Glovsky and Popeo, P.C.; Peter F. Corless

(57) ABSTRACT

A coolant demineralizer is disclosed for a fuel cell, which removes ions released from coolant for cooling a fuel cell stack to pipes. In particular the demineralizer reduces the occurrence of differential pressure due to an ion resin layer such that the coolant smoothly flows through the demineralizer, thereby maximizing the effect of filtering ions and, at the same time, the utilization of the ion resin. To this end, the demineralizer includes a housing having an inlet port, through which coolant is introduced to pass through an interior space of the housing, and an outlet port through which the coolant is discharged; and a filter member having a plate-shape such that the coolant introduced through the inlet port passes through the filter member in a direction perpendicular to the filter member.

3 Claims, 12 Drawing Sheets

LARGE-AREA DEMINERALIZER FOR FUEL CELL

CROSS-REFERENCE TO RELATED APPLICATION

This application claims under 35 U.S.C. §119(a) the benefit of Korean Patent Application No. 10-2011-0057079 filed Jun. 13, 2011, the entire contents of which are incorporated herein by reference.

BACKGROUND (a) Technical Field

The present invention relates to a coolant demineralizer for a fuel cell. More particularly, it relates to a large-area demineralizer, which removes ions from coolant within a fuel cell.

(b) Background Art

A fuel cell system employed in a hydrogen fuel cell vehicle of an environment-friendly vehicle typically includes a fuel cell stack for generating electricity by an electrochemical reaction of reactant gases, a hydrogen supply system for suitably supplying hydrogen as a fuel to the fuel cell stack, an air supply system for suitably supplying oxygen-containing air as an oxidant which is required for the electrochemical reaction in the fuel cell stack, a thermal management system for suitably removing reaction heat from the fuel cell stack to the outside of the fuel cell system, controlling operation temperature of the fuel cell stack, and performing a water management function, and a system controller for controlling the overall operation of the fuel cell system.

In the above configuration, the fuel cell stack suitably generates electrical energy via the electrochemical reaction of hydrogen and oxygen as reactant gases and discharges heat and water as by-products of the reaction. Accordingly, a system for cooling the fuel cell system in order to prevent the temperature rising within the fuel cell stack is required.

In a typical fuel cell system for a vehicle, a water cooling system for circulating water through a coolant channel in the fuel cell stack is used to cool the fuel cell stack, thus maintaining the fuel cell stack at an optimal temperature as a result.

An exemplary configuration of the cooling system of the fuel cell vehicle is shown in FIG. 1. FIG. 1 is a schematic diagram of a coolant loop of the fuel cell vehicle, which includes a coolant line 3 disposed between a fuel cell stack 1 and a radiator 2 to circulate coolant, a bypass line 4 and a three-way valve 5 for bypassing the coolant so the coolant is not passed through the radiator 2, and a pump 6 for pumping the coolant through the coolant loop.

The applicable materials for pipes/tubes/connection lines through which the coolant is fluidly communicated, which constitute the coolant loop of the fuel cell system, is very limited due to the amount of ions that are often released into the coolant by various materials. Thus, the materials chosen should have a low ionic release rate.

When cheap materials are used, impurities and ions are released from the material, which is in contact with the coolant. As a result, the electricity generated from the fuel cell stack could flow through the coolant, which can be problematic. Further, when the ion conductivity of the coolant is increased by materials used in the fuel cell vehicle, which moves while generating electricity and carrying a driver and passengers, electricity may flow through the coolant loop, which may make it very difficult for electrical devices and driving components, mounted in the vehicle, to normally operate and further may cause serious danger (such as an electric shock) to the driver and passengers. As a result, the electrical conductivity of the coolant in the fuel cell vehicle needs to be measured at all times, and a control logic for shutting down the fuel cell system when the electrical conductivity is increased to or beyond a predetermined level is employed.

Moreover, a demineralizer 7 is provided in the coolant loop to maintain the ion conductivity of the coolant below a predetermined level. The demineralizer 7 serves to reduce the ion conductivity below a predetermined level by filtering ions contained in the coolant flowing through the fuel cell stack 1.

FIG. 2 is a perspective view of a conventional demineralizer, FIG. 3 is a longitudinal cross-sectional view of FIG. 2, and FIG. 4 is a diagram showing a differential pressure region (in which an ion resin is filled) in the conventional demineralizer.

The demineralizer 100 typically includes a housing 110 through which coolant is passed, an inlet port 120 and an outlet port 130 through which the coolant is introduced and discharged, an ion resin 101 filled in the housing 110 to filter ions contained in the coolant, and mesh assemblies 140a and 140b for supporting the ion resin 101 filled in the housing 110 to prevent the ion resin 101 from leaking.

In the above configuration, the mesh assemblies 140a and 140b serve to suitably pass the coolant through the housing and entrap the ion resin 101 in the form of small grains in the housing 110. The mesh assemblies 140a and 140b are suitably provided at both the inlet port 120 and the outlet port 130 at both ends of the housing 110 to prevent the ion resin 101 within the housing 110 from leaking.

In the demineralizer 100 having the above-described configuration, the coolant introduced through the inlet port 120 of the housing 110 passes through the mesh assembly 140a, the ion resin 101, and the mesh assembly 140b and is then discharged through the outlet port 130 of the housing 110. While the coolant passes through the ion resin 101, ions are filtered and removed. The removal of ions from the coolant makes it possible to suitably prevent current leakage from the fuel cell stack, and thereby improves the electrical safety of the vehicle to meet industrial standards.

However, in the conventional demineralizer 100 shown in FIGS. 2 to 4, the coolant flows through a longitudinal/vertical path between the inlet port 120 and the outlet port 130, and the region, in which the ion resin 101 is filled, along the longitudinal path corresponds to a region in which a difference in coolant pressure (differential pressure) occurs between the inlet side and the outlet side. As a result, the coolant passing through the region in the longitudinal (axial) direction increases the differential pressure region in the demineralizer 100 (the region in the longitudinal direction in which the ion resin is filled in FIGS. 3 and 4, i.e., the region between the top and bottom of the housing), and thus a considerable difference in pressure occurs between the coolant introduced through the inlet port 120 and the coolant discharged through the outlet port 130.

FIG. 5 is a graph showing an increase in differential pressure with respect to an increase in coolant flow rate in the conventional demineralizer. As can be seen from FIG. 5 there is a large differential pressure, which forms when the flow rate of coolant is increased.

It is known that when the coolant passes through an ion resin layer in the longitudinal direction, the region of the ion resin layer, where the coolant introduced through the inlet port is filtered, that is, the width or area of the ion resin layer, which actually removes ions, within the coolant flow path in the longitudinal direction, is about typically about 15 to 30 mm The ion resin in the downstream section beyond this width of the ion resin layer, which actually removes ions, typically has a lower filtering effect, and thus it is not necessary to increase the length of the ion resin layer to or beyond the longitudinal length of the housing. The ion resin in the downstream other than the region, which contributes to the actual filtering, is unnecessary.

Accordingly, when the demineralizer is configured so that the coolant is suitably introduced through one end of the housing, passes through the ion resin layer in the longitudinal direction, and reaches the other end of the housing, an excessive amount of the ion resin is used, which increases the manufacturing cost and significantly increases the differential pressure in the system.

Further, while the ion resin layer in the vicinity of the outlet port, through which the coolant is suitably discharged, is not used for the filtering of ions, the ion resin layer in the vicinity of the inlet port, through which the coolant is suitably introduced, is mainly used for the filtering of ions. Therefore, when the demineralizer must be replaced with new one due to a long-term use of the ion resin in the vicinity of the inlet port, it is necessary to replace the entire demineralizer with new one, although the ion resin in the vicinity of the outlet port is still usable, while the ion resin in the vicinity of the inlet port is not. This inefficient use of materials leads to increased maintenance costs.

Further, as shown in FIG. 1, the conventional demineralizer is mounted in a bypass loop, rather than in a main coolant loop. In the demineralizer as shown in FIGS. 2 to 4, a high differential pressure is formed due to the increased length of the differential pressure region in the ion resin layer and, as a result, it is very difficult to effectively circulate the coolant. Problematically, because the coolant does not flow smoothly through the system, there is a significant reduction in the ionic filtering effect, and thereby the electrical conductivity is not sufficiently reduced during initial start-up of the vehicle. As a result, it is difficult to prevent the current leakage during the initial start up of the vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a large-area demineralizer for a fuel cell configured to prevent the occurrence of differential pressure due to an ion resin layer so that coolant flows smoothly through the demineralizer, thereby increasing the effect of filtering ions and, at the same time, solving the problems of generation of electrical conductivity, current leakage from a fuel cell stack, and electrical safety.

In one aspect, the present invention provides a coolant demineralizer for a vehicle fuel cell system, which is provided in a coolant loop, the coolant demineralizer includes: a housing having an inlet port, through which coolant is introduced to pass through an interior space of the housing, and an outlet port through which the coolant is discharged; and a filter member in which an ion resin for removing ions from the coolant is filled. The filter member is disposed between the inlet port and the outlet port in the housing, and may have a plate-shape such that the coolant introduced through the inlet port may pass through the filter member in a direction perpendicular to the filter member.

In a preferred embodiment, the inlet port and the outlet port may be disposed in a direction parallel to the filter member at both sides of the filter member.

In another preferred embodiment, the housing may include a filter chamber, in which the plate-shaped filter member is accommodated, and an inlet portion and an outlet portion, which are disposed at or on both sides of the filter member. More specifically, the inlet port and the outlet port disposed at or on both sides of the filter member may be formed within the inlet portion and the outlet portion.

In still another preferred embodiment, the inlet port and the outlet port may be disposed up and down on opposite sides of the housing, respectively.

In yet another preferred embodiment, the inlet port may be disposed at the bottom of the housing and the outlet port may be disposed at the top of the housing.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
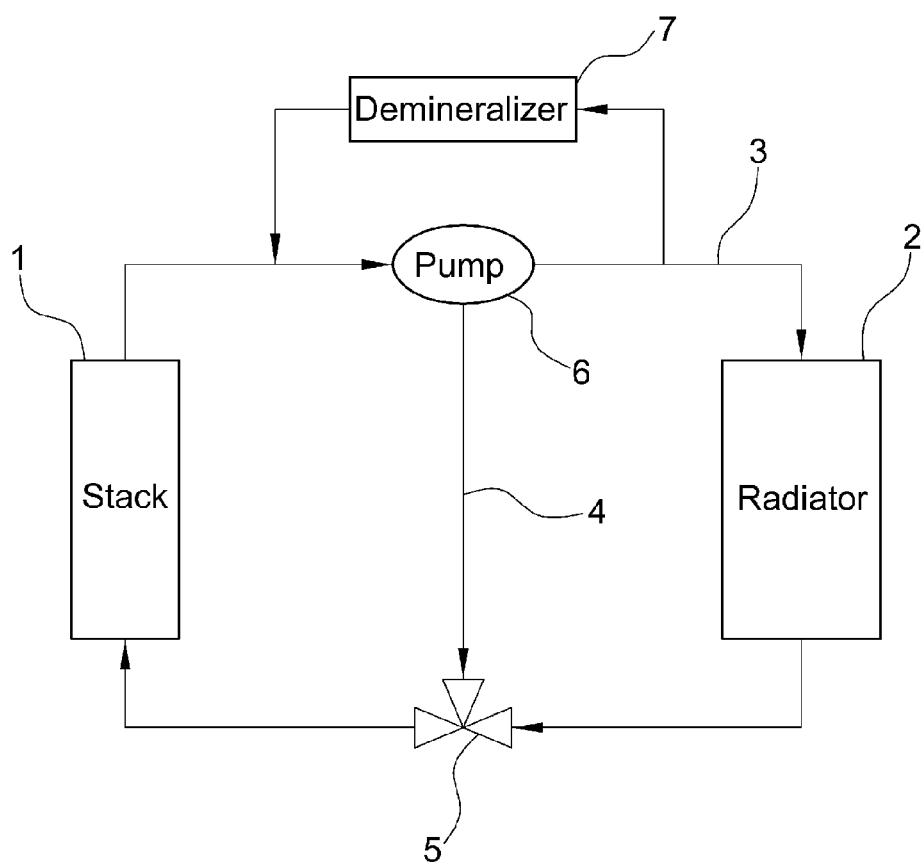
FIG. 1 is a schematic diagram of a typical coolant loop for a fuel cell vehicle.

Reference numerals set forth in the Drawings includes reference to the following elements as further discussed below:

100: demineralizer
110: housing
111: inlet portion
112: filter chamber
113: outlet portion
114: inlet port
115: outlet port
140: filter member
141: ion resin It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, both gasoline-powered and electric-powered vehicles.

One method for solving the above described problem is discussed in Korean Patent Application Publication No. 10-2010-0061731 which is herein incorporated by reference in its entirety.

The above-mentioned coolant demineralizer uses a hollow filtering member, through which the coolant passes in a radial direction. As a result, the above-referenced demineralizer is able to reduce the thickness of the ion resin layer, which allows the coolant to more smoothly flow through the demineralizer, thereby increasing the effect of filtering ions.

Additionally, reduction in electrical conductivity during initial start, which causes current leakage in the system from the fuel cell stack, is also prevented by the above system, and thus it is possible to improve the electrical safety of the driver.

In particular, it is possible to also considerably reduce the occurrence of differential pressure when the head of the coolant pump is suitably low, that is, when the flow rate of coolant is lower during the initial start-up compared to the conventional demineralizer (shown in FIGS. 2 to 4), and thus it is possible to ensure the electrical safety during the initial start-up.

Further, since the thickness of the filter member can be suitably reduced so that it does not affect the filtering performance, it is possible to reduce the amount of ion resin used, and thus it is possible to reduce the manufacturing cost.

However, even in the case of this hollow filter member, it is necessary to further increase the effect of filtering ions while reducing the occurrence of differential pressure due to the ion resin layer.

The present invention provides a demineralizer for a fuel cell, which is provided in a coolant loop for a fuel cell stack to remove ions from coolant within the coolant loop. In particular, the present invention is characterized by the use of a plate-shaped filter member filled with an ion resin and by an optimized position and arrangement of coolant inlet and outlet ports.

In preferred exemplary embodiments of the present invention, the cross-sectional area of flow can be increased and, at the same time, the length of an ion resin layer through which coolant passes (i.e., the length of a differential pressure region through which coolant passes) can be reduced, thereby preventing the occurrence of differential pressure and ensuring increased filtering performance and durability of the ion resin.

Figure 6:
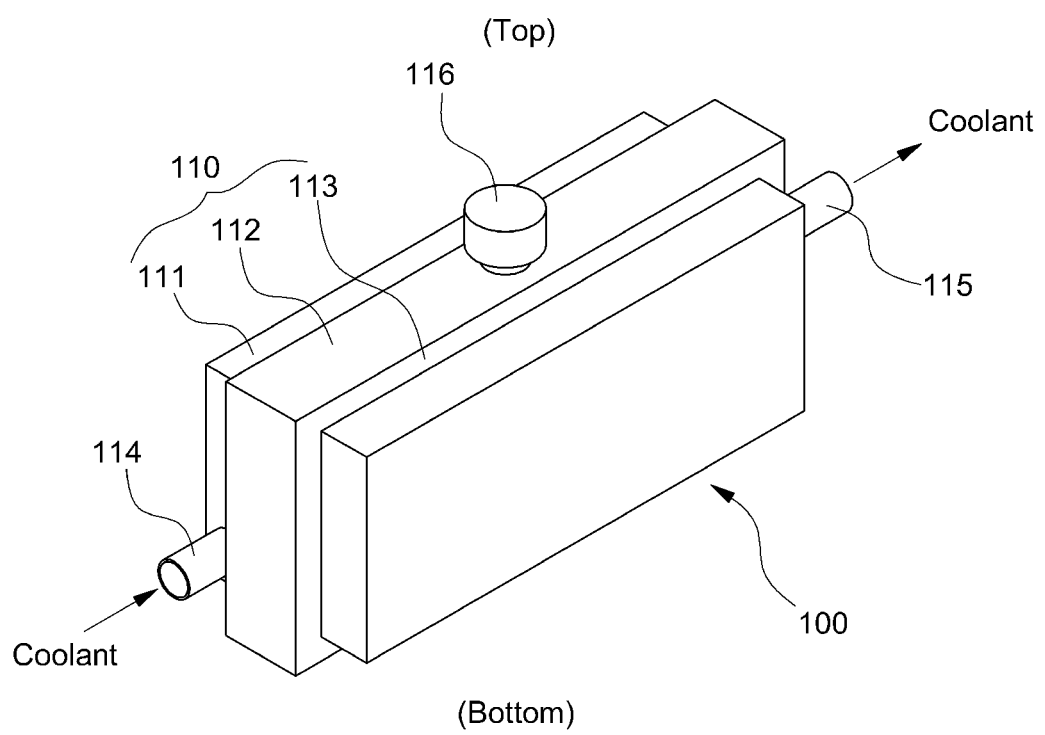
FIG. 6 is a perspective view of a demineralizer in accordance with an exemplary embodiment of the present invention.
Figure 7:
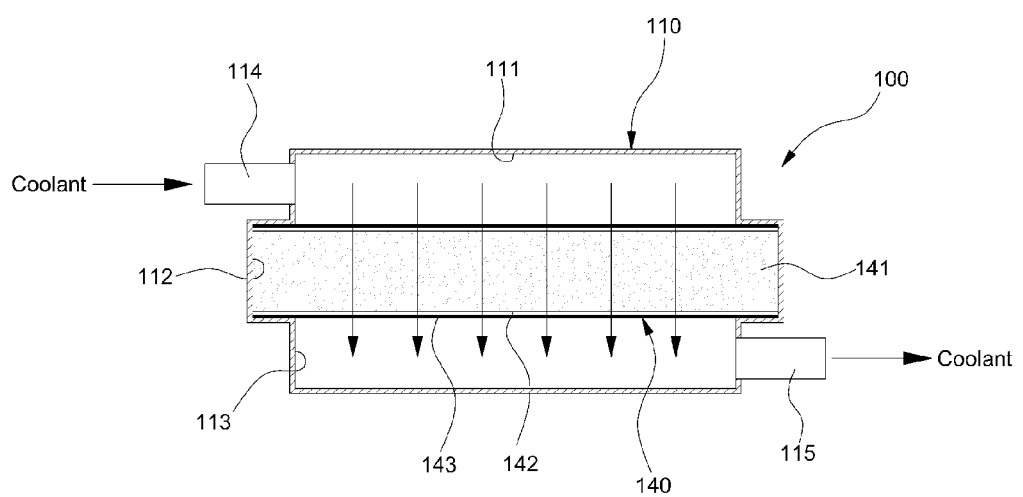
FIG. 7 is a cross-sectional view of the demineralizer of FIG. 6.

Next, the preferred exemplary embodiments of the present invention will be described with reference to the accompanying drawings. FIG. 6 is a perspective view of a demineralizer in accordance with an exemplary embodiment of the present invention, and FIG. 7 is a cross-sectional view of the demineralizer, taken along line A-A of FIG. 6.

As shown in the figures, a large-area demineralizer 100 in accordance with the present invention includes a housing 110 having an inlet port 114, through which coolant is introduced, and an outlet port 115, through which the coolant is discharged, and a plate-shaped filter member 140 disposed between the inlet port 114 and the outlet port 115 in the housing 110 and filled with an ion resin 141.

In the demineralizer 100 of the present invention, an inlet portion 111 corresponding to the upstream side, through which the coolant introduced through the inlet port 114 passes before passing through the filter member 140, is provided on one side of the housing 110 to be connected to the inlet port 114.

An outlet portion 113 corresponding to the downstream side, through which the coolant passing through the filter member 140 passes before being discharged through the outlet port 115, is provided on the other/opposite side of the housing 110 to be connected to the outlet port 115.

A filter chamber 112, in which the plate-shaped filter member 140 is mounted, is provided between the inlet portion 111 and the outlet portion 113 in the housing 110. The inlet portion 111 is located on one side of the filter chamber 112 corresponding to the upstream side with respect to the filter chamber 112, and the outlet portion 113 is located on the other side of the filter chamber 112 corresponding to the downstream side with respect to the filter chamber 112.

That is, the inlet portion 111 and the outlet portion 113 are disposed on opposite sides of the housing 110 with respect to the plate-shaped filter member 140, and the inlet port 114 and the outlet port 115 are provided on the inlet portion 111 and the outlet portion 113, respectively, to be arranged on both sides of the filter member 140.

The inlet portion 111, the filter chamber 112, and the outlet portion 113 in the housing 110 may have a rectangular parallelepiped shape, respectively. The inlet portion 111 on one side, the filter chamber 112 in the middle, and the outlet portion 113 on the other side are integrally formed and connected to each other such that the coolant can sequentially pass through the interior space formed in the housing 110 by the inlet portion 111, the filter chamber 112, and the outlet portion 113 thus allowing the cooling to be fluidly communicated through the large area demineralizer 100.

The overall shape of the housing 110 may be a rectangular parallelepiped box shape as shown in FIG. 6. The filter member 140 is accommodated in the filter chamber 112, a space between the inlet portion 111 and the outlet portion 113, to increase the cross-sectional area of flow. As the plate-shaped filter member 140 is mounted in the housing 110, the large-area demineralizer 100 can be constructed.

The filter member 140 serves to remove ions from the coolant and is filled with an ion resin (denoted by reference numeral 141 in FIG. 7). For example, the filter member 140 may have a structure in which an ion resin is filled in with a mesh net.

Here, the mesh net may be provided to completely cover the entire ion resin, and thus the filter member 140 may have a structure in which the ion resin 141 is filled in the rectangular parallelepiped mesh net such that the ion resin 141 in the form of small grains are not exposed to the outside, i.e., a structure in which the mesh net surrounds the entire periphery of the ion resin layer.

After the plate-shaped filter member 140 is configured by filling the ion resin 141 in the mesh net, the plate-shaped filter member 140 is accommodated in the filter chamber 112 between the inlet portion 111 and the outlet portion 113.

Otherwise, as shown in FIG. 7, a mesh net 142 may be formed into a plate shape and disposed at the boundary between the filter chamber 112 and the inlet portion 111 and at the boundary between the filter chamber 112 and the outlet portion 113, respectively. In this case, the ion resin 141 is filled between the mesh nets 142 on both sides to construct the filter member 140 between the inlet portion 111 and the outlet portion 113.

A porous filter frame 143 may be further provided on the outside of the mesh nets 142 on both sides in order to fix the mesh nets 142. Here, the filter frame 143 overlapping the mesh nets 142 is also disposed at the boundary between the filter chamber 112 and the inlet portion 111 and at the boundary between the filter chamber 112 and the outlet portion 113, respectively. In this case, a gasket (not shown) may be further interposed between the outside of the filter frame 143 and the inside of the filter chamber 112 to prevent the ion resin 141 from leaking.

Further, a cap 116 may be provided on an inlet of the filter chamber 112 to be used when the ion resin 141 is filled and replaced. That is, the cap 116 is opened when the ion resin 141 is first filled and then closed. Moreover, the cap 116 is opened when the used ion resin 141 is replaced with a new one and then closed.

The thickness of the filter member 140 is determined by considering the capacity of a cooling system, i.e., the flow rate range of coolant circulating through a coolant loop under typical operating conditions of the fuel cell, and is not particularly limited in the present invention. However, the thickness of the filter member 140 may be determined by considering the thickness of an effective ion resin layer (e.g., 15 to 30 mm) which actually contributes to the removal of ions, i.e., the thickness of the ion resin layer which actually contributes to the filtering, and the utilization of the entire ion resin. Here, the thickness of the filter member 140 should be determined by considering the entire flow rate range of coolant such that an excessive amount of (unnecessary) ion resin is not used.

Referring to FIG. 7, it can be seen that the plate-shaped filter member 140 is accommodated in the rectangular parallelepiped space of the filter chamber 112, in which a first side of the filter member 140 corresponds to the inlet portion 111 and a second side of the filter member 140 corresponds to the outlet portion 113. That is, while the coolant fed through the inlet portion 111 (i.e., the coolant from which ions are not removed) passes through the filter member 140, the ions contained in the coolant are removed, and the coolant passing through the filter member 140 (i.e., the coolant from which ions are removed) is discharged back into the coolant loop through the outlet portion 113.

In a preferred embodiment, the inlet port 114 and the outlet port 115 are formed at each end of the inlet portion 111 and the outlet portion 113 of the housing 110, respectively, and may be formed in a direction parallel to the filter member 140 on both sides of the filter member 140 accommodated in the filter chamber 112 of the housing 110.

Accordingly, the coolant is fed into the inlet portion 111 through the inlet port 114 in a direction parallel to that of the filter member 140. Then, as shown in FIG. 7, the coolant passes through the plate-shaped filter member 140 in a direction perpendicular to the filter member 40 and is finally discharged from the outlet portion 113 on the side of the filter member 140 through the outlet port 115 again in the direction parallel to the filter member 140.

In the case where the inlet port 114 and the outlet port 115 are disposed in the direction parallel to the filter member 140, the flow of coolant can be uniformly distributed over the entire region of the filter member 140 when the coolant flowing through the inlet port 114 in the direction parallel to the filter member 140 passes through the filter member 140 in the direction perpendicular to the filter member 140.

The reason that the inlet port 114 and the outlet port 115 are disposed in the direction parallel to the filter member 140 is to provide uniform distribution of the coolant over the entire area of the filter member 140. The uniform distribution makes it possible to ensure the filtering performance and the durability of the ion resin 141 and the demineralizer 100.

Figure 8:
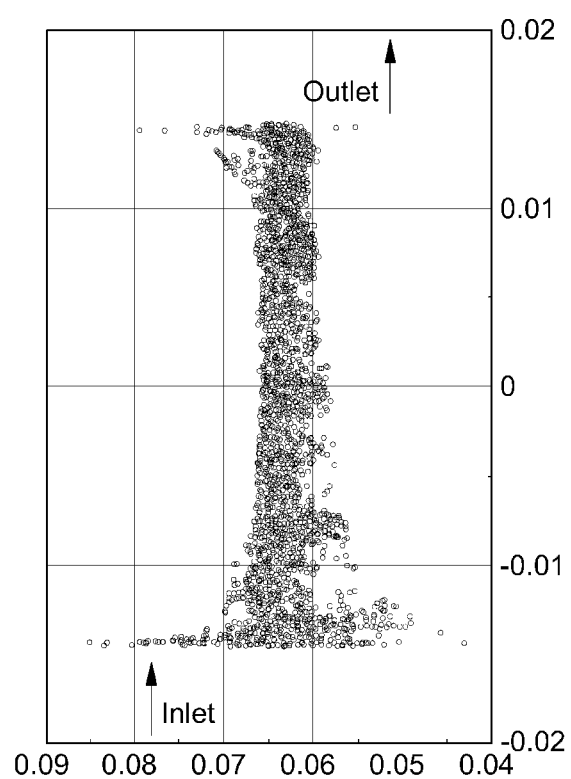
FIG. 8 is a diagram showing the analysis results of coolant distribution during arrangement of inlet and outlet ports in accordance with an exemplary embodiment of the present invention.

FIG. 8 is a diagram showing the analysis results of coolant distribution when the inlet and outlet ports 114 and 115 are arranged as in the present invention, in which the distribution of coolant passing through the filter member 140 is shown. As shown in the figure, it can be seen that the coolant uniformly passes through the entire area of the filter member 140.

Figure 9:
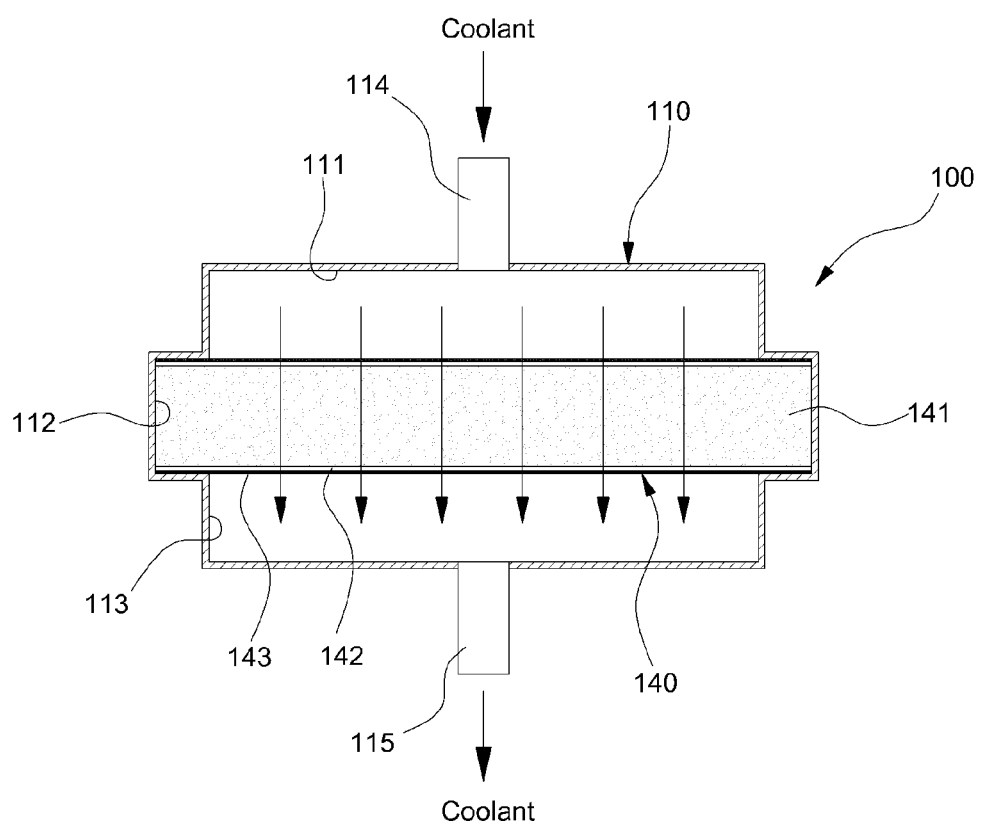
FIGS. 9 and 10 are diagrams showing comparative examples in which inlet and output ports are disposed in a direction perpendicular to a filter member.
Figure 10:
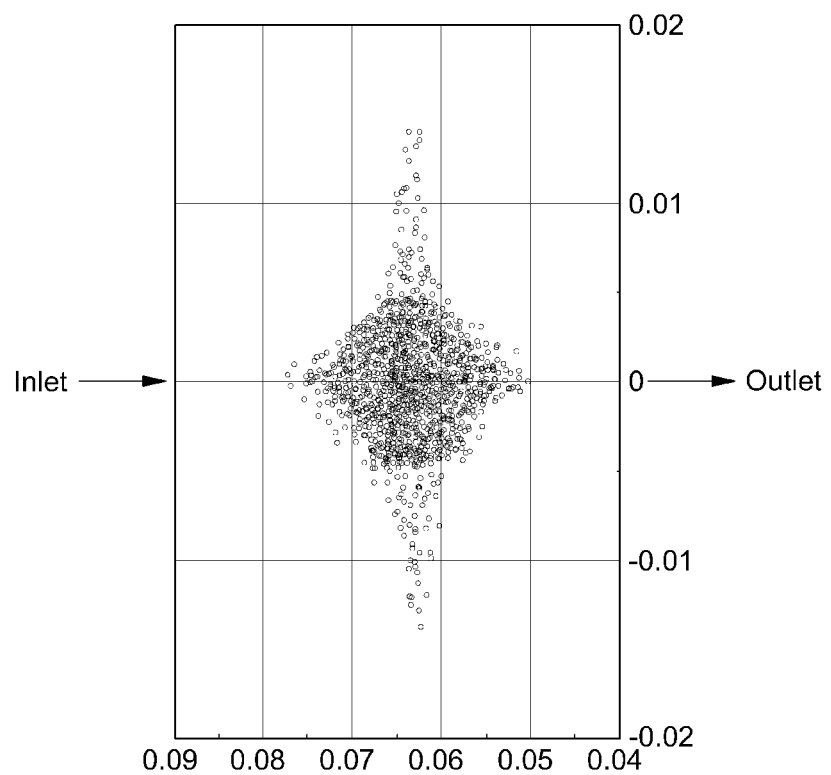

FIGS. 9 and 10 are diagrams showing comparative examples in which the inlet and output ports 114 and 115 are disposed in a direction perpendicular to the filter member 140. As shown in the figures, when the inlet and outlet ports 114 and 115 are arranged in a direction perpendicular to the filter member 140, the coolant supply and discharge directions are perpendicular to the filter member 140 as well as the direction of coolant passing through the filter member 140. In this case, the coolant supplied through the inlet port 114 passes through the ion resin layer of the filter member 140 in the direction perpendicular to the filter member 140, which results in a reduction in differential pressure. However, most of the coolant passes through the middle of the filter member 140, which is problematic.

Moreover, when the inlet and outlet ports 114 and 115 are arranged in t direction perpendicular to the filter member 140 on any side of the housing/chamber, (i.e., not in the middle portion), most of the coolant passes through only a part of the filter member 140 adjacent to the inlet port 114. As such, when most of the coolant passes through only the middle portion or a particular part of the filter member 140, the ion resin layer corresponding to that part is intensively used, thereby reducing the durability.

In a preferred embodiment of the present invention, however, the inlet port 114 and the outlet port 115 are arranged in a diagonal direction at opposite sides of the housing 110. In this case, as shown in FIG. 6, the inlet port 114 may be formed on the bottom of the inlet portion 111 of the housing 110 and the outlet port 115 may be formed on the top of the outlet portion 113 of the housing 110 on the opposite side of the housing 110.

The reason that the inlet port 114 is formed at the bottom of the housing 110 and the outlet port 115 is formed at the top of the housing 110 is to facilitate the discharge of bubbles in the coolant. That is, when the coolant fed into the housing 110 is discharged through the outlet port 115 at the top, bubbles are not formed in the coolant. Moreover, fine bubbles contained in the coolant may be separated from the liquid coolant and gathered mainly at the top of the housing 110. However, in this case, the outlet port 115 are located at the top of the housing 110, and thus the bubbles are readily discharged through the outlet port 115 rather than remaining in the housing 110.

If the inlet port is located at the top and the outlet port is located at the bottom such that the coolant is fed through the top and discharged through the bottom, the bubbles separated from the coolant may be gathered at the top of the housing and, in this case, the bubbles present at the top may not easily be discharged to the outside through the outlet port at the bottom.

Further, the bubbles may be gathered in both corners of the top of the housing, and thus the corners correspond to dead zones in which ions are not filtered by the demineralizer. When such dead zones are formed due to the generation of bubbles, the filtering area is reduced. That is, the partially unused ion resin reduces the utilization of the ion resin, which in turn deteriorates the overall performance of the demineralizer.

Preferably, the both corners of the top of the housing may have a round shape, not an angulated shape, so that bubbles are not formed in the housing and, in this case, able to more easily be discharged from the housing, thereby reducing the dead zones.

As such, the present invention is characterized by the use of the plate-shaped large-area filter member 140 and by the optimized position of the inlet and outlet ports 114 and 115 such that the coolant passes through the plate-shaped filter member 140 in the housing 110 in the direction perpendicular to the filter member 140 and is then discharged to the outside. Accordingly, the length of the ion resin layer (corresponding to the differential pressure region), through which the coolant passes, i.e., the thickness of the filter member 140 can be suitably reduced to the extent that it does not affect the filtering performance, i.e., to the thickness of an effective ion resin layer which actually contributes to the removal of ions. As a result, the occurrence of different pressure in the demineralizer 100 can be considerably reduced (and thus the coolant can smoothly flow in the demineralizer).

Moreover, as the inlet and outlet ports 114 and 115 are disposed in the direction parallel to the filter member 140, the flow of coolant can be uniformly distributed over the entire region of the filter member 140, and thus the utilization of the ion resin 141 and the effect of filtering ions can be maximized Further, as a result, it is possible to reduce the manufacturing and maintenance costs and further increase reduction of electrically conductivity during an initial start-up (which causes a delay in start-up).

Figure 11:
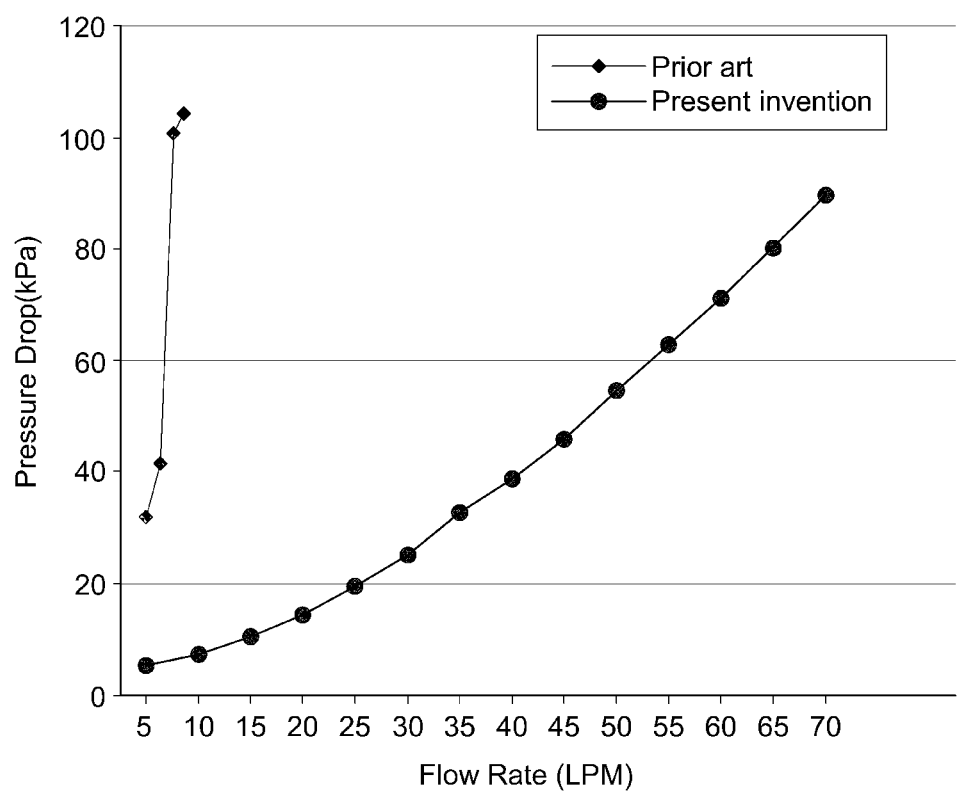
FIGS. 11 and 12 are graphs comparing the performance of the demineralizer in accordance with an exemplary embodiment of the present invention with that of a conventional demineralizer (i.e., a hollow demineralizer).
Figure 12:
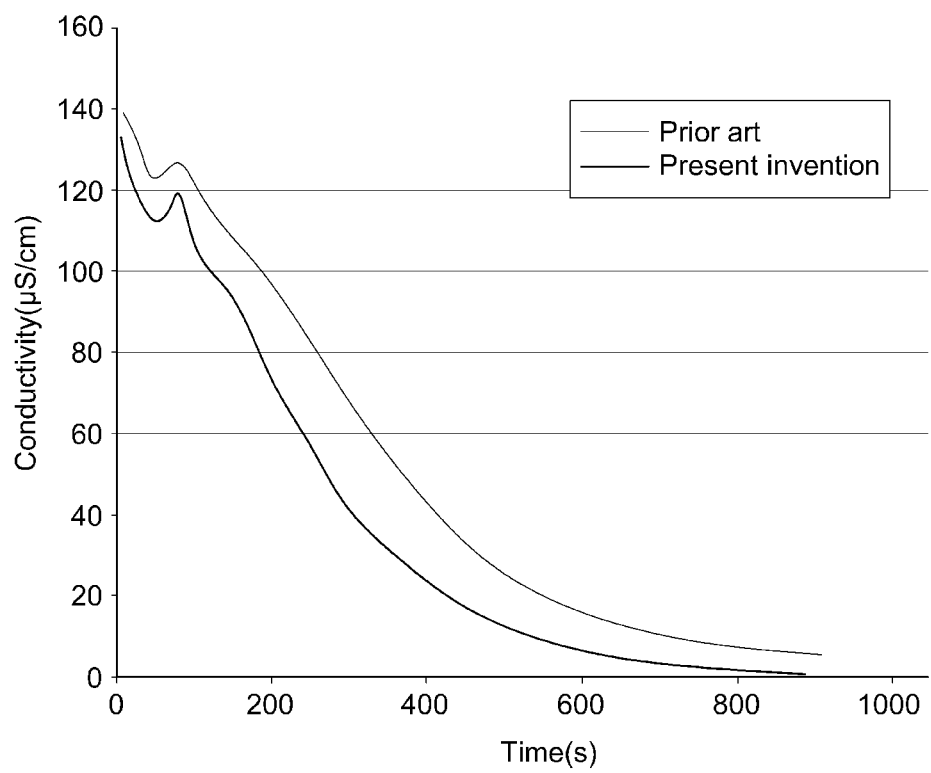

FIGS. 11 and 12 are graphs comparing the performance of the demineralizer in accordance with the present invention with that of a conventional demineralizer (i.e., a hollow demineralizer), in which FIG. 11 shows the comparison results of pressure drop and FIG. 12 shows the measurement results of filtering efficiency.

Figure 2:
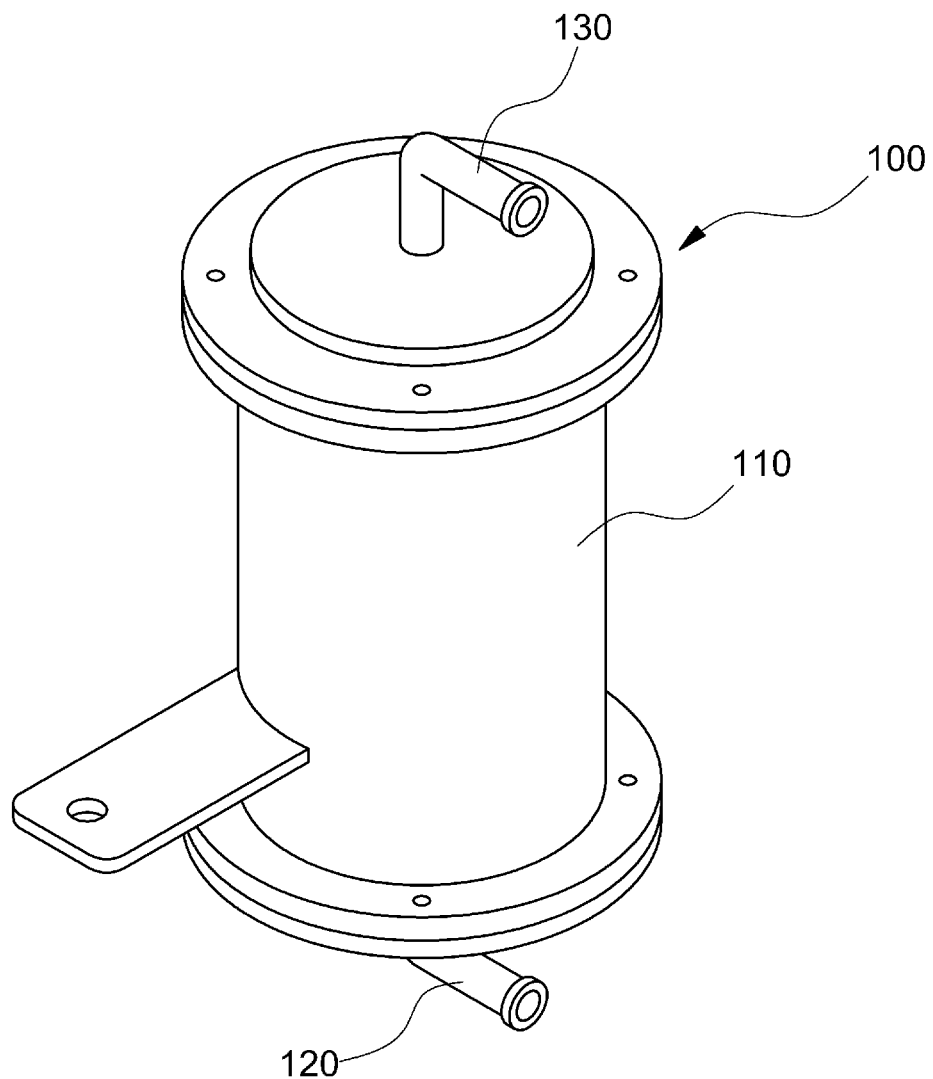
FIG. 2 is a perspective view of a conventional coolant demineralizer for a fuel cell vehicle.
Figure 3:
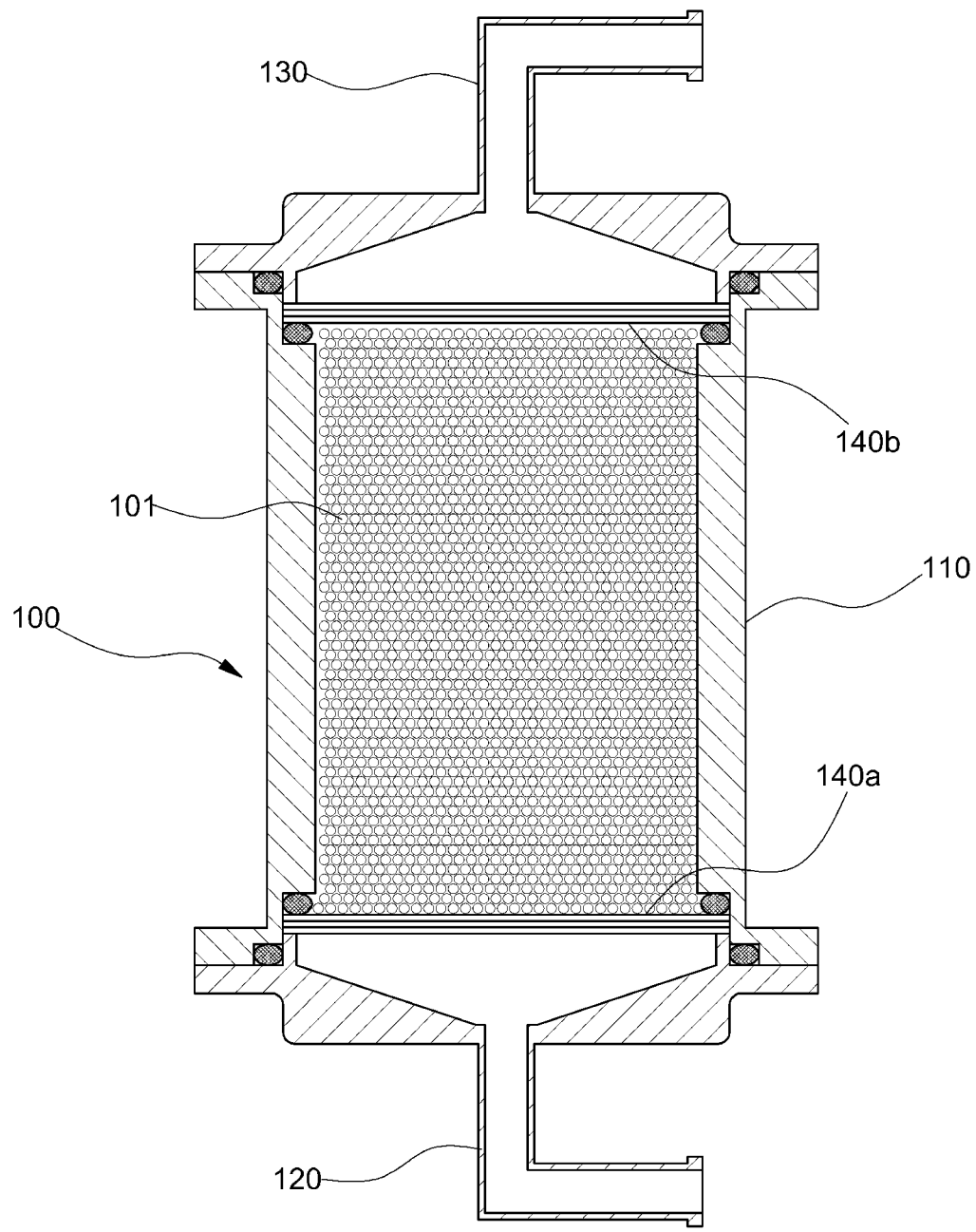
FIG. 3 is a longitudinal cross-sectional view of the conventional coolant demineralizer of FIG. 2.
Figure 4:
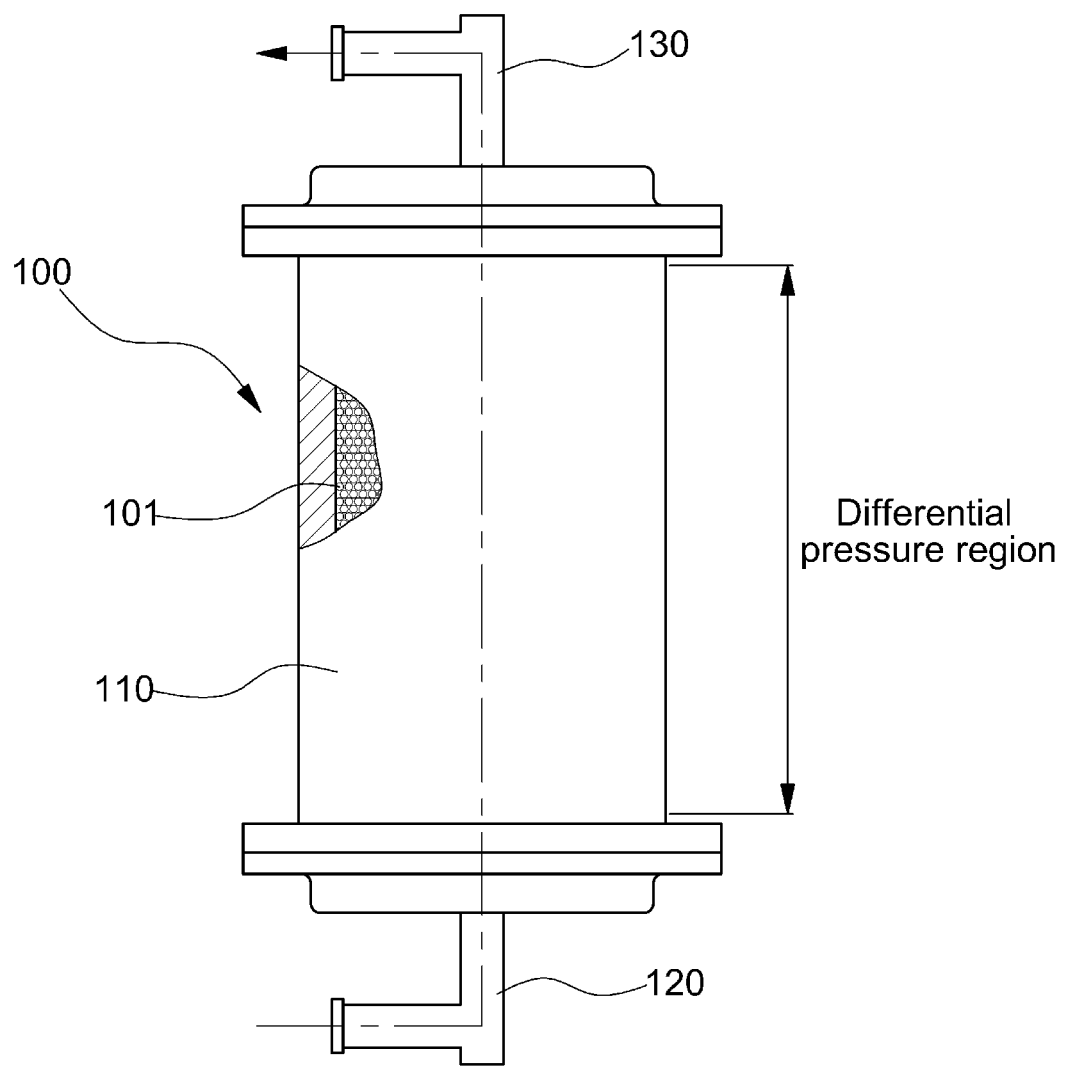
FIG. 4 is a diagram showing a differential pressure region in the conventional coolant demineralizer.
Figure 5:
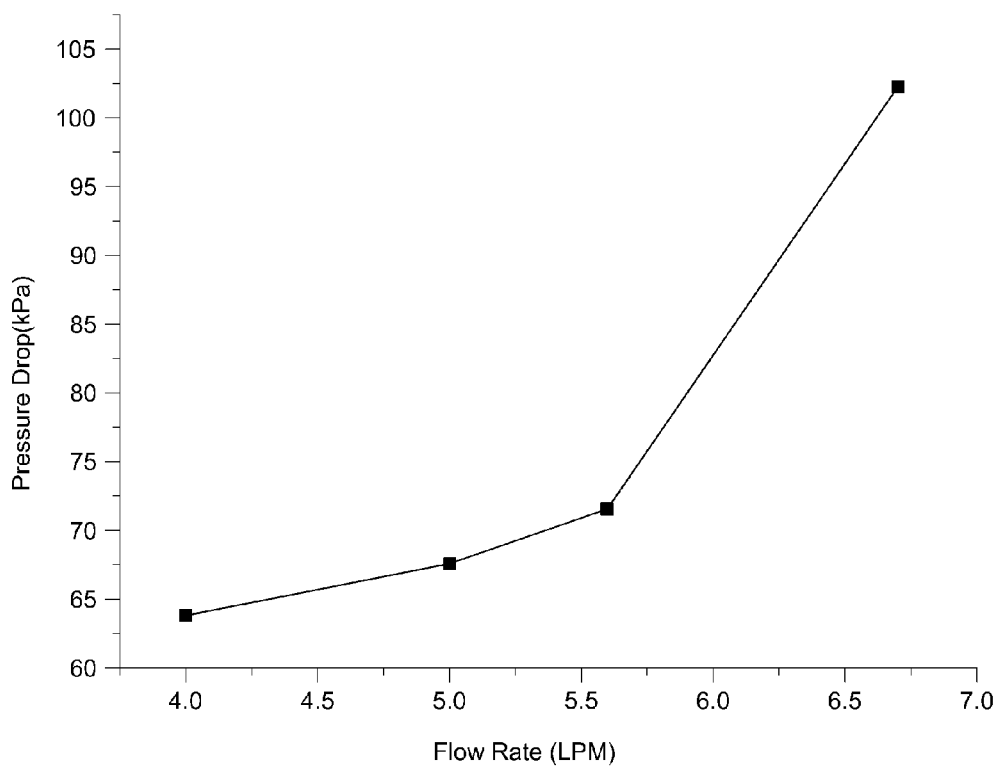
FIG. 5 is a graph showing an increase in differential pressure with respect to an increase in coolant flow rate in the conventional demineralizer.

In the demineralizer of the present invention, the pressure drop (i.e., differential pressure) can be considerably reduced compared to the conventional demineralizer using the hollow filter member as well as the demineralizer of FIGS. 2 to 4. Referring to FIG. 11, it can be seen that the occurrence of differential pressure due to the ion resin layer is clearly reduced in the demineralizer of the present invention compared to the conventional demineralizer. This shows in turn that the flow rate of coolant can be increased in the demineralizer of the present invention under the same differential pressure compared to the conventional demineralizer.

When the structure of the filter member is modified to have a plate shape to reduce the occurrence of differential pressure as in the present invention, the flow of the coolant passing through the demineralizer is suitably distributed, which increases the filtering efficiency, thereby rapidly reduces the electrical conductivity of the coolant.

FIG. 12 shows the effect of reducing the electrical conductivity during the initial start-up when the demineralizer of the present invention and the conventional (hollow) demineralizer are used, in which the amount of time that the initial electrical conductivity is reduced from about 120 μS/cm to less than about 1 μS/cm under the same conditions (the same ion resin, the same pump pressure, and the same number of facilities) is shown.

As shown in the figure, it can be seen that the occurrence of differential pressure is suitably reduced and the reduction in the electrical conductivity is improved in the demineralizer of the present invention and that the amount of time required to reach the electrical conductivity of less than 1 μS/cm during initial start-up is considerably reduced compared to the demineralizers according to the prior art and the comparative example.

Ion release occurs in all the components that constitute the coolant loop after parking for a predetermined time such as on weekends, etc., and thus the electrical conductivity of the coolant typically increases (for example, from the range of about 0.5 to 2 μS/cm to the range of about 5 to 8 μS/cm). It can be seen from the results of FIG. 12 that the electrical conductivity of the coolant is reduced to a normal value (i.e., less than 2 μS/cm) after start-up in the demineralizer of the present invention in significantly less time than in the comparative example.

As described above, according to the large-area demineralizer of the present invention, since the coolant passes through the plate-shaped filter member in a direction perpendicular to the filter member, the occurrence of differential pressure is reduced and the flow of coolant is uniformly distributed, thereby maximizing the effect of filtering ions.

As a result, it is possible to rapidly reduce the electrical conductivity during initial start-up of the fuel cell vehicle, and thus it is possible to prevent the current leaking and improve the safety of the driver.

In particular, it is possible to considerably reduce the occurrence of differential pressure when a head of the coolant pump is lowered, that is, when the flow rate of coolant is low during the initial start-up compared to the conventional demineralizer, and thus it is possible to ensure the electrical safety during the initial start-up.

Further, the position and arrangement of the inlet and outlet ports are optimized such that the flow of coolant is uniformly distributed over the entire region of the filter member, and thus it is possible to maximize the utilization of the ion resin and the effect of filtering ions and reduce the manufacturing and maintenance costs.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A coolant demineralizer for a vehicle fuel cell system, which is provided in a coolant loop, the coolant demineralizer comprising:

a housing including an inlet port, through which coolant is introduced to pass through an interior space of the housing, and an outlet port through which the coolant is discharged; and a filter member in which an ion resin for removing ions from the coolant is filled and which is disposed between the inlet port and the outlet port in the housing, wherein the filter member has a plate-shape such that the coolant introduced through the inlet port passes through the filter member in a direction perpendicular to the filter member, and wherein the inlet port and the outlet port are disposed in a direction parallel to the filter member on opposite sides of the filter member, the inlet port and the outlet port are disposed diagonally from each other in the housing, respectively, and the inlet port is disposed at a bottom of the housing and the outlet port is disposed at a top of the housing.

2. The coolant demineralizer of claim 1, wherein the housing comprises a filter chamber, in which the plate-shaped filter member is accommodated, and an inlet portion and an outlet portion, which are disposed on opposite sides of the filter member.

3. A demineralizer for a vehicle fuel cell system, which is provided in a coolant loop, the demineralizer comprising:

a housing including an inlet port, disposed in a bottom portion of the housing, through which coolant is introduced to pass through an interior space of the housing, and an outlet port, disposed in a top portion of the housing, through which the coolant is discharged;

a filter member in which an ion resin for removing ions from the coolant is disposed therein, the filter member disposed between the inlet port and the outlet port in the housing;

an inlet portion corresponding to an upstream side, through which coolant introduced through the inlet port passes before passing through the filter member, that is provided on one side of the housing to be connected to the inlet port;

an outlet portion corresponding to a downstream side, through which the coolant passing through the filter member passes before being discharged through the outlet port, that is provided on another opposite side of the housing to be connected to the outlet port; and a filter chamber, in which the filter member is mounted, that is provided between the inlet portion an the outlet portion in the housing, wherein the demineralizer is formed so that the coolant enters the housing in a first direction that is parallel to the filter member through the inlet port disposed in the bottom portion of the housing and then coolant passes up through the filter member in a second direction perpendicular to the filter member and is finally discharged through the outlet port again in the first direction parallel to the filter member in the top portion of the housing, and where both corners of the housing have a round shape.

\* \* \* \* \*